(12) United States Patent
Sishtla et al.

(10) Patent No.: US 8,907,838 B1
(45) Date of Patent: Dec. 9, 2014

(54) RADAR AIDED DOPPLER COMPENSATION

(75) Inventors: Venkata A. Sishtla, Marion, IA (US); Jeffery A. Finley, Cedar Rapids, IA (US); Mark B. Godfrey, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 584 days.

(21) Appl. No.: 13/247,646

(22) Filed: Sep. 28, 2011

(51) Int. Cl.
*G01S 13/00* (2006.01)

(52) U.S. Cl.
USPC ............ 342/26 B; 342/26 R; 342/82; 342/83; 342/84

(58) Field of Classification Search
USPC .... 342/26 R, 26 A, 26 B, 26 C, 26 D, 70–72, 342/82–84, 104
See application file for complete search history.

(56) References Cited

U.S. PATENT DOCUMENTS

| | | | | |
|---|---|---|---|---|
| 2,914,763 A * | 11/1959 | Greenwood, Jr. et al. | ...... | 342/61 |
| 3,028,592 A * | 4/1962 | Parr et al. | ......... | 342/61 |
| 3,795,910 A * | 3/1974 | Robinson, Jr. | .................. | 342/82 |
| 4,354,191 A * | 10/1982 | Matsumura et al. | ............. | 342/83 |
| 4,403,220 A * | 9/1983 | Donovan | ........................ | 342/29 |
| 4,435,707 A * | 3/1984 | Clark | ........................ | 342/26 B |
| 5,093,662 A * | 3/1992 | Weber | ........................ | 342/26 D |
| 5,451,961 A * | 9/1995 | Rubin et al. | ................... | 342/159 |
| 5,670,962 A * | 9/1997 | Henderson et al. | ............. | 342/70 |
| 5,748,141 A * | 5/1998 | Hoess | ............................. | 342/109 |
| 5,861,836 A * | 1/1999 | Hoss | ............................. | 342/70 |
| 6,587,074 B1 * | 7/2003 | Winter et al. | ................. | 342/130 |
| 6,590,524 B1 * | 7/2003 | Farley et al. | ............. | 342/357.48 |
| 6,646,587 B2 * | 11/2003 | Funai | ......................... | 342/26 R |
| 6,690,317 B2 * | 2/2004 | Szeto et al. | ................... | 342/26 R |
| 7,049,997 B2 * | 5/2006 | Alford et al. | ................ | 342/26 R |
| 7,345,620 B2 * | 3/2008 | Voigtlaender et al. | .......... | 342/82 |
| 7,417,578 B1 * | 8/2008 | Woodell et al. | ............. | 342/26 R |
| 7,528,765 B1 * | 5/2009 | Woodell et al. | ............. | 342/26 B |
| 7,541,971 B1 * | 6/2009 | Woodell et al. | ................ | 342/173 |
| 7,561,067 B2 * | 7/2009 | Matayoshi et al. | ........... | 340/973 |
| 7,796,082 B2 * | 9/2010 | Wood | ............................ | 342/205 |
| 7,804,444 B2 * | 9/2010 | Yamashina | ..................... | 342/70 |
| 7,852,261 B2 * | 12/2010 | Stafford | ........................ | 342/195 |
| 7,880,665 B1 * | 2/2011 | Knight | ........................ | 342/26 R |
| 8,077,081 B2 * | 12/2011 | Bateman et al. | ............. | 342/195 |
| 2003/0117311 A1 * | 6/2003 | Funai | ............................... | 342/26 |
| 2003/0184470 A1 * | 10/2003 | Ishii et al. | ..................... | 342/174 |
| 2006/0109170 A1 * | 5/2006 | Voigtlaender et al. | .......... | 342/82 |

* cited by examiner

*Primary Examiner* — Peter Bythrow (74) *Attorney, Agent, or Firm* — Angel N. Gerdzhikov; Donna P. Suchy; Daniel M. Barbieri (57) ABSTRACT

A radar system includes an antenna. The radar system comprises a processor for providing an error in ground speed estimate based upon Doppler velocity data, and a transmitter. The frequency of radar signals from the transmitter is adjusted according to a velocity of the aircraft calculated using the error in ground speed estimate or using the error in ground speed estimate. The adjusted frequency can allow ground clutter to be removed by high pass filtering in one embodiment.

20 Claims, 7 Drawing Sheets

RADAR AIDED DOPPLER COMPENSATION

BACKGROUND

The present disclosure relates generally to the field of aircraft radar systems. More specifically, the present disclosure relates to reducing ground clutter and/or false alerts due to RF artifacts (spurs, etc.) in aircraft radar systems.

Conventional weather radar systems emit a generally uniform, rectangular pulses of energy. The pulses reflect off a target and are received by the radar system as radar returns. Airborne weather radar systems analyze the radar returns to detect weather and other targets and to determine if certain other weather phenomena is present (e.g., turbulence, wind shear, etc.).

Generally, it is desirable to detect wind shear at lower altitudes. Detecting wind shear at lower altitudes can be difficult because signal strength of a return from a wind shear event can be relatively small when compared to ground clutter. This difficulty is exacerbated when smaller antennas are utilized.

Conventional radar systems have utilized high pass filters to remove returns associated with ground clutter. The high pass filters can have a 3 decibel (dB) cut-off frequency at approximately 200 Hz. Generally, the frequency associated with ground clutter is moved to 0 Hz so that the high pass filter can reject ground clutter returns in the receiver. The ground clutter returns are conventionally translated to 0 Hz or DC (a static return) in a post-reception process.

The post-reception process relies upon a numerically controlled oscillator (NCO) and mixes multiple frequencies to translate the return to 0 Hz. Due to numerically controlled oscillator (NCO) operations in the receiver, existing RF artifacts at DC, such as, spurs, are moved to other frequencies. As hardware ages and becomes more prone to leakage, the generation spurious signals can be more prevalent in the post-reception process. Spurious signals can appear as wind shear targets during weather target analysis and result in a false alert, caution or warning. Additionally, if a spurious signal is very strong, it can saturate the analog-to-digital (A-to-D) converter in the receiver which causes clipping. Clipping results in harmonic frequency signals which can also appear as a wind shear target and cause a false alert, caution or warning.

Thus, there is a need for a method of and a system for reducing spurious signals in radar operations. Further still, there is need for a method and a system for reducing spurious signals during wind shear detection while reducing ground clutter. Further still, there is a need for a method of and a system for wind shear detections which does not have the disadvantages associated with post-reception ground rejection processes.

There is further needed a radar system capable of reducing ground clutter without increasing spurious frequency signals. There also is a need for a radar system for and method of detecting weather phenomena, such as, wind shear events, with fewer false alerts.

SUMMARY

One embodiment of the application relates to a radar system including an antenna. The radar system comprises a processor for providing a ground speed estimate based upon Doppler velocity data, and a transmitter. The frequency of radar signals from the transmitter is adjusted according to a velocity of the aircraft determined using the ground speed estimate.

Another embodiment of the application relates to an aircraft radar system for receiving a radar return associated with a radar signal. The aircraft radar system comprises means for transmitting the radar signal and receiving the radar return. The aircraft radar system also comprises means for directing the radar signal toward ground to obtain a Doppler parameter associated with a speed of an aircraft and adjusting a frequency of the radar signal in accordance with the speed of the aircraft.

Another embodiment of the application is related to a method of mitigating effects of intermediate frequency and static spurs. The method comprises providing a radar signal directed toward ground at a frequency, and receiving a Doppler parameter from a return of the radar signal. The Doppler parameter is associated with a speed of the aircraft. The method further includes adjusting the frequency of the radar signal in accordance with the speed of the aircraft.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION OF THE EXEMPLARY EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to one embodiment, a method of using a radar system (e.g., a weather radar system) determines an accurate ground speed and adjusts the transmitter frequency associated with the determined ground speed. The transmitter frequency is adjusted so that the ground clutter can be removed by a high pass filter. The method can include receiving at least first return data associated with a first radar signal provided by the weather radar sensing the Earth's surface, and receiving second return data associated with a second radar signal provided by the weather radar sensing the Earth's surface. The method includes processing the return data to determine a factor related to the ground speed of the aircraft. The method also includes adjusting the transmit frequency of the weather radar signal so that signals associated with ground clutter are closer to 0 Hz and can be more easily filtered by a high pass filter.

Figure 1:
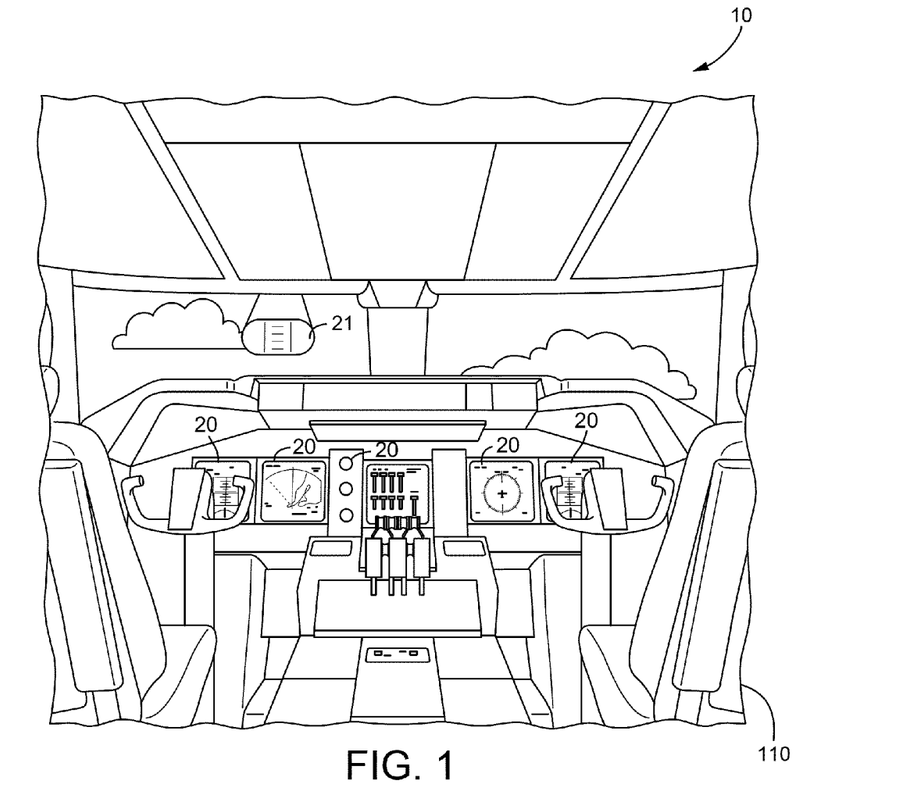
FIG. 1 is a schematic perspective view illustration of an aircraft control center or cockpit, according to an exemplary embodiment.

Referring to FIG. 1, an illustration of an aircraft control center or cockpit 10 for an aircraft 110 is shown, according to one exemplary embodiment. Aircraft control center 10 includes flight displays 20 which are used to increase visual range and to enhance decision-making abilities. In an exemplary embodiment, flight displays 20 may provide an output from a flight management computer, flight management system, an altitude heading reference system (AHRS), global positioning system (GPS) navigation system or other location or navigation device that can use drift angle, heading angle, track angle or ground speed parameters. The display system for center 10 may include a head-up display system 21.

Figure 2:
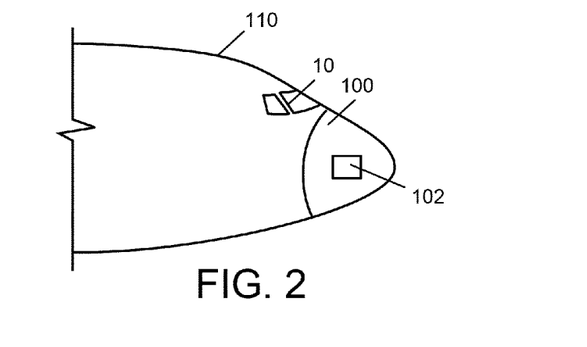
FIG. 2 is a schematic side view illustration of a front of an aircraft with an aircraft radar system, according to an exemplary embodiment.

In FIG. 2, the front of aircraft 110 is shown with aircraft control center 10 and nose 100, according to an exemplary embodiment. A radar system, such as a weather radar system 102, is generally located inside nose 100 of the aircraft or inside a cockpit of the aircraft. According to other exemplary embodiments, weather radar system 102 may be located on the top of the aircraft or on the tail of the aircraft. Weather radar system 102 may include or be coupled to an antenna system.

Figure 3:
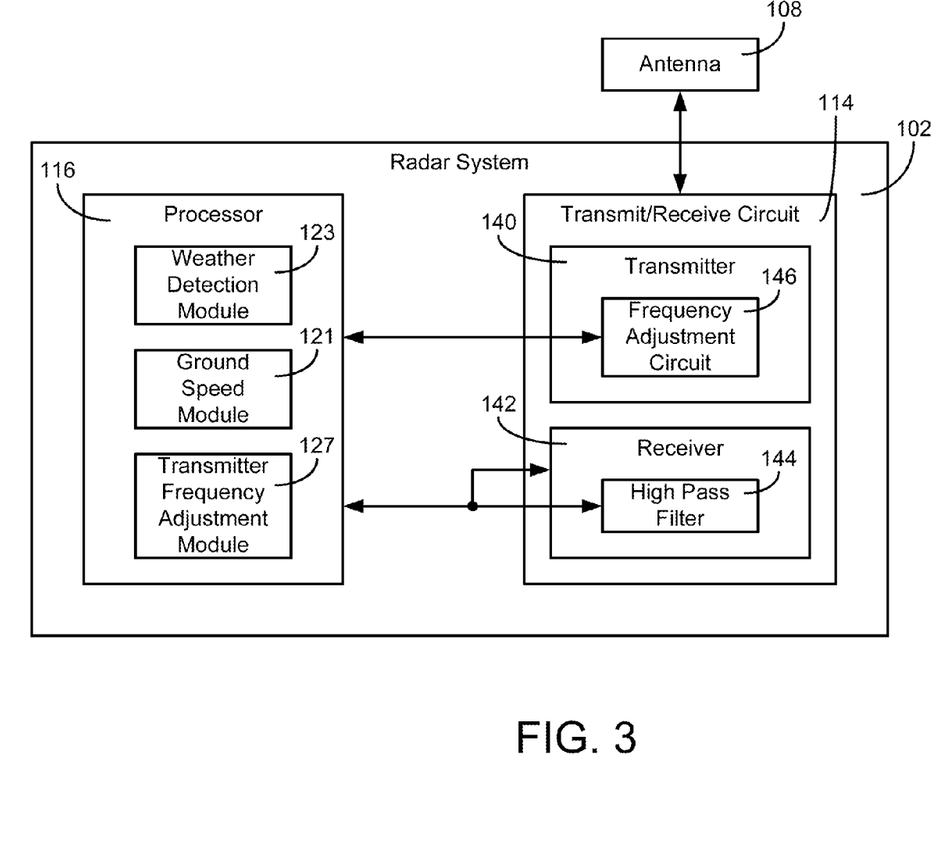
FIG. 3 is a general block diagram of the aircraft radar system illustrated FIG. 2, according to an exemplary embodiment.

With reference to FIG. 3, weather radar system 102 is shown in greater detail, according to an exemplary embodiment. Weather radar system 102 may be coupled to or include an antenna 108. Antenna 108 may receive radar returns from a target, such as weather, terrain, etc. Weather radar system 102 can be a system for detecting weather patterns using weather radar returns such as an FAA approved/certified weather radar. Detected weather patterns and associated cautions, warnings, and alerts can be communicated to displays 20 for display to the flight crew.

In a preferred embodiment, weather radar system 102 includes a transmit/receive circuit 114, a memory 118, antenna 108, and electronics (e.g., a processor 116). Processor 116 includes a weather detection module 123, a ground speed module 121 and a transmitter frequency adjustment module 127. Radar system 102 preferably provides radar signals via antenna 108 and receives radar returns from transmit/receive circuit 114.

Antenna 108 is preferably a small, dish shaped radar antenna, such as a radar antenna having a diameter of having less than two feet (e.g., 18 inches to 2 feet) suitable for use with business jet aircraft. Alternatively, antenna 108 can have a diameter of approximately 18 inches (or be a larger antenna). Antenna size and shape are not discussed in a limiting fashion. System 102 can utilize a larger antenna size including sizes associated with air transport aircraft.

In a preferred embodiment, processor 116 processes the returns using Doppler techniques to determine Doppler velocity factors or parameters. The Doppler velocity factors or parameters can be used to calculate a ground speed parameter using ground speed module 121. Module 121 can be embodied as a separate unit, as part of system 102, or as part of another avionic system.

Radar system 102 can measure velocities of aircraft 110 relative to the Earth's surface using radar returns that strike the Earth's surface. The aircraft velocities relative to the Earth's surface can be used to determine the ground speed. Module 121 can use either vertical, diagonal or horizontal sweeps or both types of sweeps to reliably provide a weather radar derived ground speed parameter. The parameter can be used as a real time source for confirmation, replacement or adjustment of other speed values used in avionic systems on board aircraft 110.

Transmit/receive circuit 114 preferably includes a transmitter 140 and a receiver 144. Transmitter 140 includes a frequency adjustment circuit 146 and receiver 142 includes a high pass filter 144. Circuit 146 can be embodied as a numerically controlled oscillator mixing circuit for controlling a transmit frequency. Circuit 146 can be any hardware component, software component, or combination thereof for adjusting the transmit frequency. Circuit 146 can be part of an intermediate frequency circuit or radio frequency circuit associated with transmitter 140.

Transmitter 140 provides radar signals to antenna 108 at a frequency (preferably in the X band) provided by frequency adjuster 146. Frequency adjuster 146 can be controlled by signals from processor 116 set by transmitter frequency adjustment module 127.

Receive circuit 142 receives radar returns from antenna 108 and can high pass filter the radar returns via high pass filter 144. High pass filter 144 preferably has a 3 dB cut-off frequency at 200 Hz. The values and type of filter discussed above are exemplary only and do not limit the scope of the invention unless explicitly recited in the claims. Set parameters and design criteria may affect the selection of filter values without departing from the scope of the invention.

The filtered radar returns are provided to processor 116. In one embodiment, processor 116 receives non-filtered radar returns determines ground speed via ground speed module 121 using the non-filtered radar returns. Processor 116 can use filtered radar returns from filter 114 to detect weather phenomenon (such as a windshear event) via a weather detection module 123 in one embodiment. Module 123 is preferably utilized to detect a wind shear event. Module 123 can be a predictive wind shear module.

Module 121, 123 and 127 are preferably embodied as software routines and can be combined as a single circuit or routine. Modules 121, 123 and 127 can be software instructions stored on a non-transitory medium.

In one embodiment, a navigation unit preferably communicates ground speed parameters to processor 116 so that processor 116 can appropriate adjust the frequency of the transmitted radar signal via frequency adjustment circuit 146 and module 127. Preferably, processor 116 adjusts the transmitter frequency in accordance with the ground speed so that ground clutter frequency returns are received at approximately DC or 0 Hz. With such an adjustment, ground clutter signals can be rejected via filter 144 according to one embodiment.

Applicants have found that conventional systems, such as a conventional INS can have a ground speed value which drifts by at least five knots per hour. This difference between actual ground speed and the ground speed detected by a conventional INS prevents the ground frequency from being centered at zero. For example, for an X band radar system, five knots is approximately equal to 160 Hz of Doppler shift. A five knot shift causes returns caused by ground clutter to be moved to 160 Hz instead of DC, thereby resulting in sub-optimal clutter rejection by filter 144. By rectifying errors using ground speed module 121 (e.g., using system 102 as an accurate speed sensor), ground speed module 121 can determine Doppler velocities to within 0.5 knots and thereby adjust the transmitter frequency for superior clutter rejection via high pass filter 144.

In one embodiment, transmitter 140 provides 200 pulses at 6,000 Hz pulse repetition frequency (PRF) in the X-band. Alternatively, transmitter 140 can provide other transmit signals, including signals using a different number of pulses, a different frequency, a different PRF, etc. An autocorrelation or Fast Fourier Transform (FFT) process can be used in ground speed module 121 to produce accurate ground speed estimates. Preferably, the ground speed estimates are used to provide errors in the ground speed parameter provided by a navigation unit. The errors are used to more accurately sense the ground speed so that the transmission frequency can be set more accurately and the ground clutter frequency can be more accurately removed. In addition, accurately moving ground clutter frequencies to DC via transmitter 140 as opposed to translation in a post-reception process also mitigates the effects of intermediate frequency (IF) saturation which can cause false wind shear alerts and mitigates the effects of DC spurs due to various coherent mixing processes.

Figure 4:
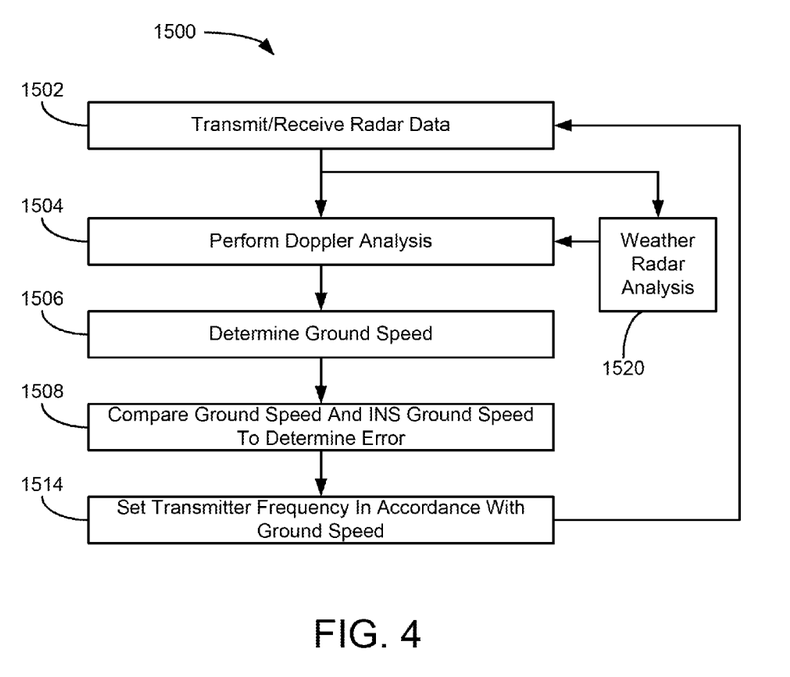
FIG. 4 is a process flow diagram of a method of adjusting transmitter frequency for the radar system illustrated in FIG. 3, according to an exemplary embodiment.

With reference to FIG. 4, a method 150 uses radar system 102 to adjust the transmit frequency of transmitter 140. At a step 1502, system 102 provides radar signals at a first transmit frequency and receives radar returns or return data. At a step 1504, system 102 performs Doppler analysis on the received radar data (e.g., weather radar returns). The Doppler analysis is used to determine a ground speed at a step 1506 using ground speed module 121. At step 1508, a ground speed parameter from navigation unit 150 is received and compared to the ground speed determined at step 1506 using ground speed module 121.

At a step 1514, a new transmitter frequency is set by transmit frequency adjustment module 127 in accordance with the new ground speed parameter. After step 1512, a radar signal at the new frequency set by transmit frequency adjustment module 127 and effected by frequency adjustment circuit 146 is transmitted and radar return data is received at step 1502.

Weather radar analysis can be performed at a step 1520 after step 1502. Such analysis can be performed by weather detection module 123. In one embodiment, weather analysis can be performed simultaneously or near simultaneously with Doppler analysis at step 1504 performed by ground speed module 121. Alternatively, weather radar analysis at step 1520 can be performed in succession with steps associated with Doppler analysis. The particular order provided in method 1500 is not shown in limiting fashion. Various steps can be combined or performed simultaneously without departing from the scope of the invention. Further, additional intervening steps can be performed without departing from the scope of the invention.

Figure 5:
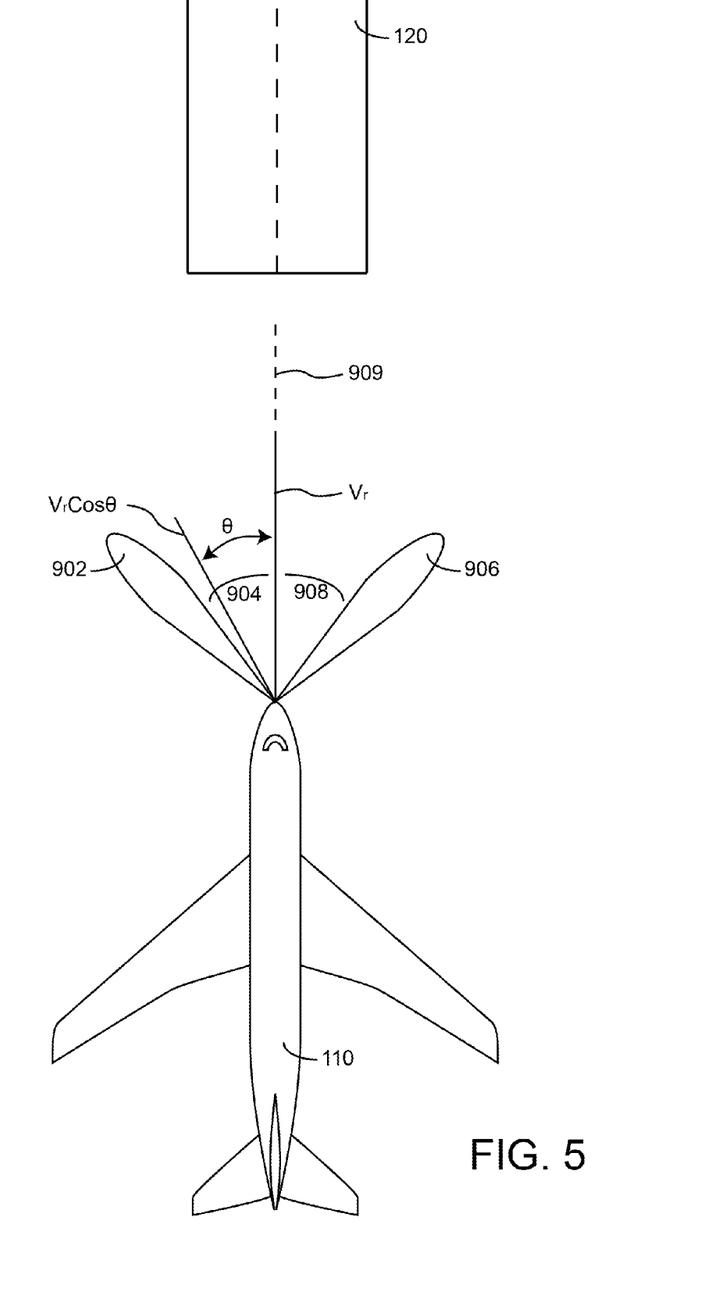
FIG. 5 is a top view schematic illustration of an aircraft using the method illustrated in FIG. 4, according to another exemplary embodiment.

With reference to FIGS. 3 and 5, weather radar system 102 provides a first radar signal, scan or beam 902 at a first angle 904 and a second radar signal, scan or beam 906 at a second angle 908. Both signals can be processed for Doppler information. The Doppler information at the two different angles determine a drift angle and a ground speed parameter or value. Preferably, angles 904 and 908 can be any angles with respect to a center axis or longitudinal axis 909 of aircraft 110.

Preferably, the scans are provided on each side of aircraft 110, but this is not required. Signals 902 and 904 reflect on the Earth's surface and are received as returns by antenna 108 and processed by processor 116 through circuit 114 of system 102. Signals 902 and 904 can be incorporated into other weather radar scans associated with weather radar system 102, such as scans used during approach (e.g., wind shear scans). The two signals can be part of a single horizontal scan. At least two signals at different angles are generally needed. The number of signals and types of scans are exemplary and do not limit the scope of the invention.

In a preferred embodiment, angles 904 and 908 are each at an azimuth angle of 45 degrees from a central axis of aircraft 110 and directed toward the Earth's surface (i.e., terrain). Radar signals 902 and 906 are provided at different azimuth angles and are scans that are directed toward the Earth's surface. Many different angles and numbers of radar signals can be utilized without departing from the scope of the invention. In a preferred embodiment, ground speeds are calculated from Doppler parameters to an accuracy of 0.5 knots or less.

With reference to FIG. 5, ground speed module 121 and transmit frequency adjustment module 126 can operate to adjust the transmit frequency. For a given transmit frequency and ground speed, Doppler shift can be calculated as follows allowing to Equation 1:

$$F_D = \frac{2V_g}{\lambda} \qquad \text{Equation 1}$$

Where:

$F_D$=Doppler Shift Frequency in Hz;
$V_g$=Ground Speed in msec from an INS or other navigation unit; and
$\lambda$=wavelength in meters.

As shown in FIG. 5, $V_R$ is a full radial velocity of aircraft 110 as calculated from radar signals. Ground speed can also be a function of tilt angle and aircraft drift angle. Equation 2 computes ground speed compensated for scan, tilt and drift angle as follows:

$$V_R = V_g \cos(S\_Angle - D\_Angle) * \cos(T\_Angle) \qquad \text{Equation 2}$$

Where:

$V_G$=Aircraft Ground Speed from an INS or other navigation system;
S_Angle=Scan Angle in degrees;
D_Angle=Drift Angle in degrees;
T_Angle=Antenna Tilt Angle in degrees; and
$V_R$ is the full radial velocity of aircraft 110—the ground speed along the flight path of aircraft 110.

Ground speed module 121 can be used to compute an estimate of error in ground speed which can then be added to inertial based value from unit 150 to accurately calculate the actual ground speed of the aircraft. According to the Equation 3, $$V_{actual} = V_R + V_{error} \qquad \text{Equation 3}$$

Where $V_{actual}$ is the ground speed of the aircraft;
$V_R$ is the full radial velocity of the aircraft; and
$V_{error}$ is the error calculated from $V_{Radar}$ and $V_R$ ($V_{error}=(V_R-V_{Radar})$). $V_{Radar}$ is calculated from Doppler parameters using autocorrelation or fast fourier transform (FFT) processes (e.g., by radar system 102 using module 121).

Therefore, from Equation 1, $$F_D = \frac{2V_{actual}}{\lambda}, \text{ and consequently,}$$

and consequently, $$TX_A = TX - F_D$$

Where:
$TX_A$=Actual transmitter frequency;
TX=Original transmitter frequency (e.g., 9,468 GHz); and
$F_D$=Doppler change due to the ground speed (computed as described above)

In one embodiment, for every wind shear epoch, the transmitter frequency can be computed as described above. The offset $F_D$ is applied to transmitter 140 using transmitter adjustment circuit 146 for radar signals during the next processing epoch.

Figure 6:
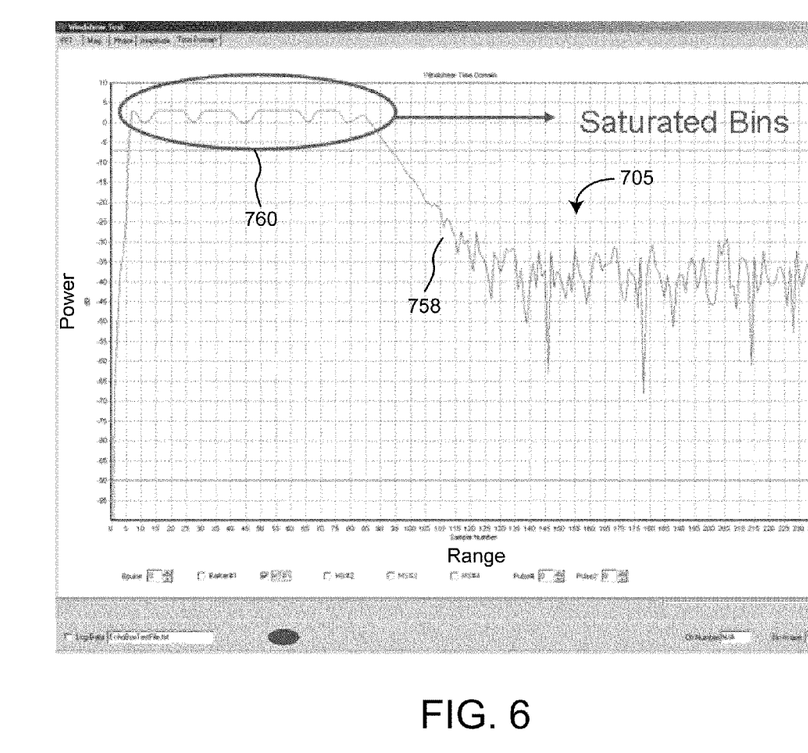
FIG. 6 is a graph showing the relationship between power and range for a radar signal including saturated bins as derived from simulation equipment.

With reference to FIG. 6, a graph 758 for a simulation using an echo box shows the relationship of power to range. A Y axis represents power, and an X axis represents range. As shown in FIG. 6, a portion 760 of graph 758 shows saturation.

Figure 7:
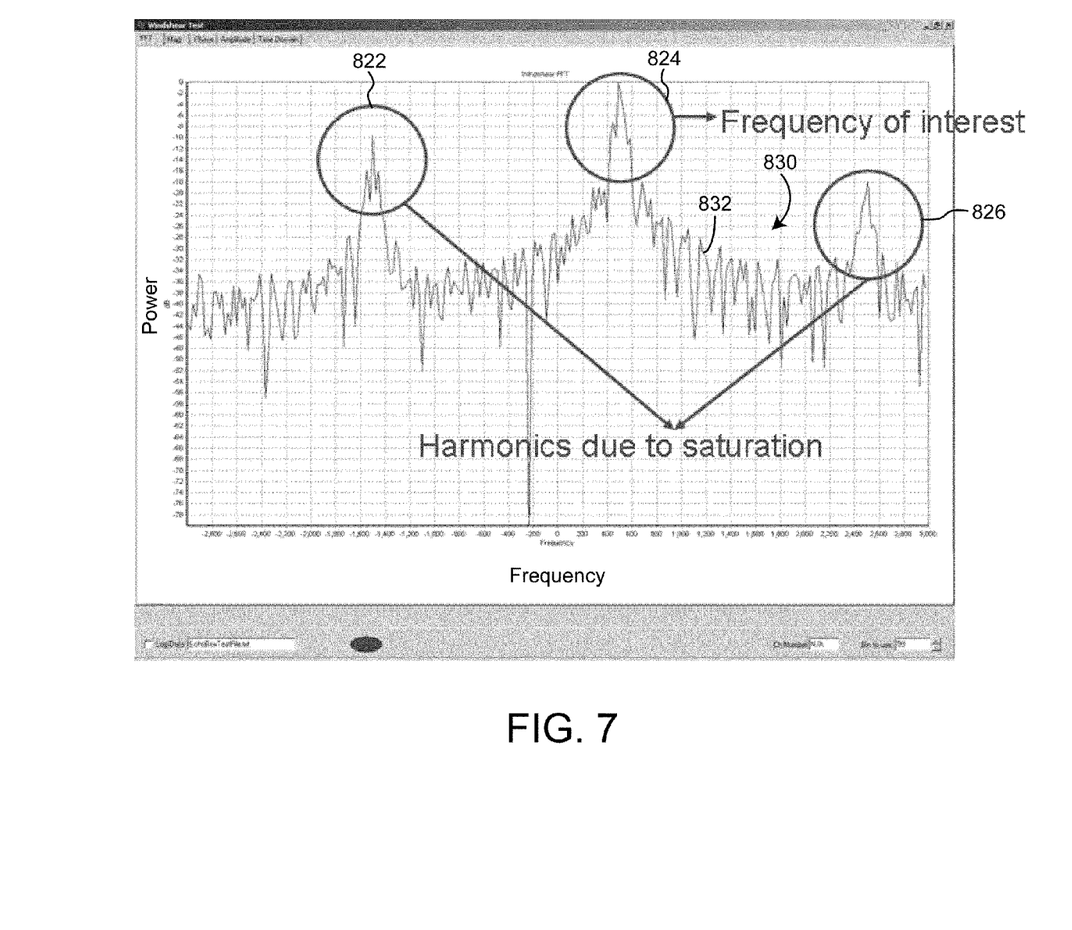
FIG. 7 is a graph showing power spectral density for the radar signal as derived from simulation equipment illustrated in FIG. 7 without Doppler compensation according to the method of FIG. 4.

With references FIG. 7, a power spectrum density 830 shows frequencies of interest in portions 822, 824 AND 826 due to saturation in portion 760 (FIG. 6) when Doppler compensation is not performed. Frequencies of interest in portions 822, 824 and 826 of graph 832 are caused by harmonics due to saturation. In FIG. 7, an X axis represents power and a Y axis represents frequency. Portion 822, 824, 826 extend into the pass region of filter 144.

Figure 8:
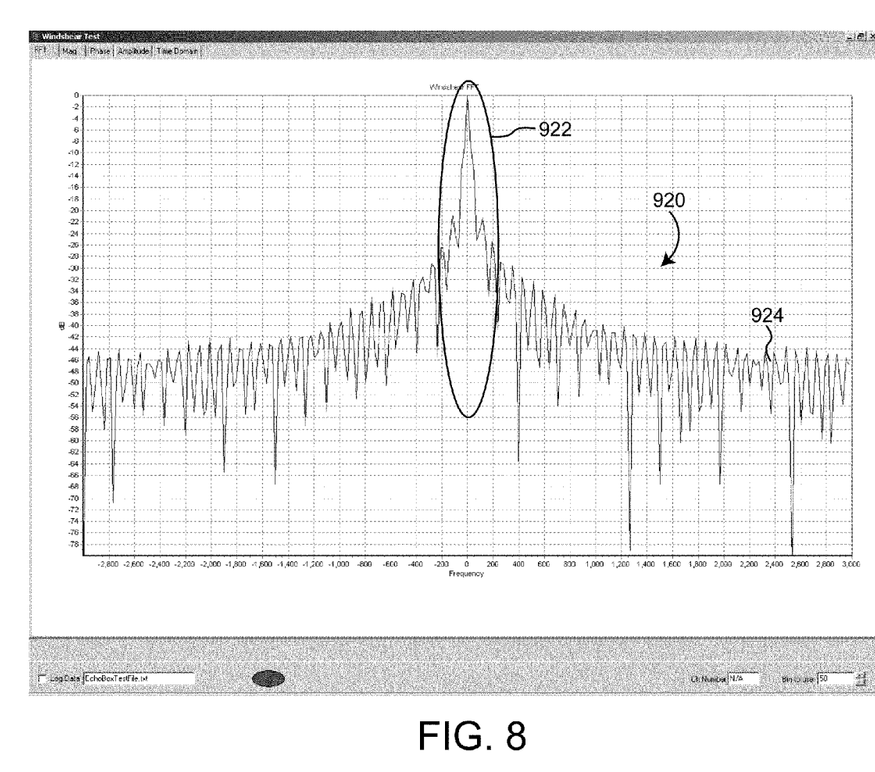
FIG. 8 is a graph of power spectral density for the radar signal as derived from simulation equipment illustrated in FIG. 7 with Doppler compensation according to the method of FIG. 4 in accordance with an exemplary embodiment.

With reference to FIG. 8, a power spectrum density 920 includes a graph 924. System 102 is simulated using an echo box with frequency adjustments made in accordance with ground speed to form graph 924. Harmonics are centered at zero Hz or DC as shown by portion 922 of graph 920. The lower frequency signals associated with portion 922 can be removed using high pass filter 144.

Although the ground speed parameters are discussed above using an error correction process involving an INS, ground speed parameter can be calculated directly by radar system 102. In such an embodiment, the ground speed parameters from by ground speed module 121 can be directly used by transmitter frequency adjustment module 127. However, using an INS with module 121 to provide an error signal provides a finer tuning mechanism for the INS in one embodiment.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A radar system including an antenna, the radar system comprising:
   a processor for providing a ground speed estimate based upon Doppler velocity data;
   a transmitter, wherein a frequency of radar signals from the transmitter is adjusted according to a velocity of the aircraft determined using the ground speed estimate,
   wherein the ground speed estimate is calculated using the Doppler velocity data and a ground speed from an inertial reference source, and
   wherein the frequency is adjusted so that ground clutter returns are moved to approximately DC and radar returns are filtered by a high pass filter to remove the ground clutter returns.

2. The radar system of claim 1, wherein the ground speed is calculated by the processor within 0.5 knots.

3. The radar system of claim 1, wherein an autocorrelation process or a Fourier transform process is used to estimate the ground speed.

4. The radar system of claim 1, wherein an error is provided to an INS.

5. The radar system of claim 1, wherein the transmitter provides 200 pulses at the adjusted frequency.

6. The radar system of claim 5, wherein the 200 pulses are used for wind shear detection.

7. The radar system of claim 1, further comprising a radar antenna having a radius of less than 2 feet.

8. The radar system of claim 1, wherein the transmitter includes a numerically controlled oscillator for providing the frequency of the radar signals.

9. An aircraft radar system for receiving a radar return associated with a radar signal, the aircraft radar system comprising:
   means for transmitting the radar signal and receiving the radar return;
   means for directing the radar signal toward ground to obtain a Doppler parameter associated with a speed of an aircraft and adjusting a frequency of the radar signal in accordance with the speed of the aircraft,
   wherein the speed of the aircraft is calculated using the Doppler parameter and a speed of the aircraft determined from an inertial reference source, and
   wherein the frequency is adjusted so that ground clutter returns are moved to approximately DC and the radar returns are filtered to remove the ground clutter returns.

10. The radar system of claim 9, further comprising a means for filtering the radar return.

11. The radar system of claim 10, wherein the means for filtering is a high pass filter with approximately 200 Hz as an approximately 3 dB cut-off frequency.

12. The aircraft radar system of claim 10, wherein the frequency is adjusted so that the means for filtering removes ground clutter in the radar return.

13. The aircraft radar system of claim 9, wherein the radar system is an X-band weather radar system.

14. The aircraft radar system of claim 9, wherein frequency equals an X band frequency plus Doppler change due to the speed of the aircraft.

15. A method of mitigating effects of intermediate frequency and static spurs, the method comprising:
   providing, using a processor, a radar signal directed toward ground at a frequency;
   receiving, using a transmitter, a Doppler parameter from a return of the radar signal, the Doppler parameter being associated with a speed of the aircraft;

adjusting, using the processor, the frequency of the radar signal in accordance with the speed of the aircraft, wherein the speed of the aircraft is calculated using the Doppler parameter and a ground speed from an inertial reference source, and wherein the frequency is adjusted so that ground clutter returns are moved to approximately DC and radar returns are filtered by a high pass filter to remove the ground clutter returns.

16. The method of claim 15, wherein the radar signal includes 200 pulses at a 6000 Hz pulse repetition frequency.

17. The method of claim 15, wherein the speed is calculated by an inertial reference system using an error factor derived from the Doppler parameter.

18. The radar system of claim 15, wherein the frequency is controlled using a numerically controlled oscillator.

19. The radar system of claim 1, wherein the processor is configured to detect wind shear via a weather detection module.

20. The radar system of claim 19, wherein the transmitter frequency is calculated for every wind shear epoch.

\* \* \* \* \*